US006347611B1

(12) United States Patent
Wright (10) Patent No.: US 6,347,611 B1
(45) Date of Patent: Feb. 19, 2002

(54) ROTARY ENGINE WITH A PLURALITY OF STATIONARY ADJACENT COMBUSTION CHAMBERS

(76) Inventor: Ellis F. Wright, 4307 Scottsdale Dr., Mesquite, TX (US) 75150

( * ) Notice: Subject to any disclaimer, the term of this patent is extended or adjusted under 35 U.S.C. 154(b) by 0 days.

(21) Appl. No.: 09/617,689

(22) Filed: Jul. 17, 2000

(51) Int. Cl.$^7$ .............................................. F02B 53/04
(52) U.S. Cl. ...................... 123/237; 123/223; 418/243; 418/248
(58) Field of Search .................. 123/237, 223, 123/43 C, 43 R; 418/61.2, 64, 248, 139, 36, 243

(56) References Cited

U.S. PATENT DOCUMENTS

| 774,056 | A | * | 11/1904 | Estes | 418/248 |
| 992,096 | A | * | 5/1911 | Wright | 123/237 |
| 1,307,282 | A | * | 6/1919 | Ward | 418/248 |
| 2,155,775 | A | * | 4/1939 | Sapp | 418/248 |
| 4,741,164 | A | | 5/1988 | Slaughter | 123/237 |
| 5,251,595 | A | * | 10/1993 | Wei-Min | 123/237 |
| 5,284,427 | A | * | 2/1994 | Wacker | 418/36 |
| 5,681,157 | A | * | 10/1997 | Wen-Ming | 418/248 |

FOREIGN PATENT DOCUMENTS

| FR | 2 591 286 A1 | * | 6/1987 | ................. 418/221 |
| GB | 2 207 703 A | * | 2/1989 | ................. 418/243 |

* cited by examiner

Primary Examiner—Thomas Denion
Assistant Examiner—Thai-Ba Trieu
(74) Attorney, Agent, or Firm—Haynes and Boone, LLP (57) ABSTRACT

An engine system includes a plurality of adjacent expansion rotor housings each having a generally cylindrical expansion rotor cavity. The expansion rotor cavity of each expansion rotor housing is substantially aligned with the expansion rotor cavity of each other expansion rotor housing. An elongated shaft extends through the expansion rotor cavity of each expansion rotor housing along a respective longitudinal axis of each expansion rotor cavity. A set of adjacent combustion assemblies is attached to each one of the expansion rotor housings. Each one of the combustion assemblies includes a combustion chamber. An expansion rotor is mounted on the shaft in the expansion rotor cavity of each expansion rotor housing such that the elongated shaft extends through a centroidal axis of each expansion rotor. A fuel delivery system is attached to each one of the combustion assemblies for providing a supply of fuel to each one of the combustion chambers. An air delivery system is attached to each one of the combustion assemblies for providing a supply of air to each one of the combustion chambers.

30 Claims, 6 Drawing Sheets

ROTARY ENGINE WITH A PLURALITY OF STATIONARY ADJACENT COMBUSTION CHAMBERS

BACKGROUND

The disclosures herein relate generally to internal combustion engines and more particularly to a rotary engine with stationary adjacent combustion chambers.

Increasing thermal efficiency is a key objective in the design and operation of engines, regardless of the type of engine. It is known that increasing the thermal efficiency of an engine has a direct impact on increasing power output and reducing harmful emissions. Current environmental and fuel supply issues make it necessary and beneficial to continually identify improved engine designs and operating techniques for increasing the thermal efficiency of internal combustion engines.

Internal combustion rotary engines illustrate one example of an energy efficient alternative to a conventional reciprocating piston-type engine. Internal combustion rotary engines are known to provide a relatively high power output for a relatively small physical engine size. Furthermore, due to the rotating operation, rotary engines are capable of operating at high engine speeds relative to typical reciprocating engines. For these reasons, internal combustion rotary engines have been used in several modern day automotive applications and several internal combustion rotary engine designs have been suggested.

U.S. Pat. No. 5,372,107 discloses a rotary engine having an oval rotor that is centrally mounted in a cylindrical chamber. The rotor is mounted on a partially hollow shaft. The cylindrical chamber includes a plurality of sliding vanes spaced around the perimeter of the cylindrical chamber. The sliding vanes are sidably mounted in the cylindrical chamber and seal against the rotor, partitioning the cylindrical chamber to provide a plurality of chambers defined between each adjacent pair of vane seals and a surface of the rotor. Each chamber is subjected to intake compression, and power events.

U.S. Pat. No. 5,247,916 discloses a rotary engine including a housing and a rotor mounted on a shaft in a cylindrical chamber of the housing. The rotor includes an eccentric compression lobe and an eccentric expansion lobe. An air-fuel intake mixture is compressed within a compression chamber defined by the cylindrical chamber, the compression lobe of the rotor and a compression gate after being introduced through an intake manifold. After being compressed, the air-fuel intake mixture is transferred to a rotating combustion chamber, in which combustion of the gases is initiated by an ignition device. After ignition, the compressed air-fuel intake mixture forms expanding combustion gases that are transferred to a space defined by the cylindrical chamber, the expansion lobe of the rotor and an expansion gate, causing rotation of the rotor. The eccentric design of the expansion lobe limits each rotor to only one power event per revolution.

U.S. Pat. Nos. 4,860,704 and 4,741,164 each disclose a rotary internal combustion engine which includes a lobed expansion rotor and a lobed compression rotor mounted on a common engine shaft in a side-by-side configuration. The expansion and compression rotors are mounted in corresponding cylindrical chambers of an engine housing such that an expansion chamber and a compression chamber are defined between corresponding cylindrical chambers and the respective rotor. The engine housing includes a single combustion chamber adjacent to the expansion chamber. During rotation of the rotors, compressed air is developed within the compression chamber and is communicated from the compression chamber to the combustion chamber through a combustor passage. Fuel is added to the compressed air such that a combustible intake mixture is formed. A first hinged valve controls the flow of the compressed air from the compression chamber to the combustion chamber. Ignition of the intake mixture forms a combustion gas that is communicated from the combustion chamber to the expansion chamber through a second hinged valve, such that pressure is exerted against the expansion rotor for forcefully rotating the engine shaft. The ability to increase the thermal efficiency of this engine is significantly limited by the rates at which the intake charge and combustion take place in a single combustion chamber rotary engine. Furthermore, because the second hinged valve rides on lobes of the expansion rotor, the movement of the second hinged valve, and thus the intake and power events, are largely dictated by the lobe profile of the expansion rotor. Accordingly, even though the intake and power events take place in separate physical environments, these two events are not functionally separable.

Internal combustion rotary engines are particularly well suited for independently performing the expansion and combustion phases of the power events and for independently performing the compression and power events. By doing so, to the degree that a specific engine configuration permits, each of these events can be individually designed and controlled such that the thermal efficiency is increased. However, previous attempts to develop an internal combustion rotary engine configuration that allows the various engine events to be separately performed have been costly to implement, provided only marginal improvements in the thermal efficiency and exhibited unacceptable reliability.

Therefore, what is needed is a cost-effective and reliable internal combustion rotary engine that permits the various engine events and phases of the events to be separately performed, and that permits multiple power events per rotor cycle.

SUMMARY

Accordingly, in one embodiment, a rotary engine provides a plurality of power events per cycle of the rotor and permits the combustion and expansion phases of the power event to be separately controlled. To this end, a rotary engine includes an expansion rotor housing having a generally cylindrical expansion rotor cavity. An elongated shaft extends through the expansion rotor cavity along a centroidal axis of the expansion rotor housing. A first set of adjacent combustion assemblies is attached to the expansion rotor housing. Each one of the combustion assemblies includes a combustion chamber. An expansion rotor is mounted on the shaft in the expansion rotor cavity such that the elongated shaft extends through a centroidal axis of the expansion rotor.

A principal advantage of this embodiment is that the thermal efficiency is increased, contributing to increased performance and reduced harmful emissions.

DETAILED DESCRIPTION

Figure 1:
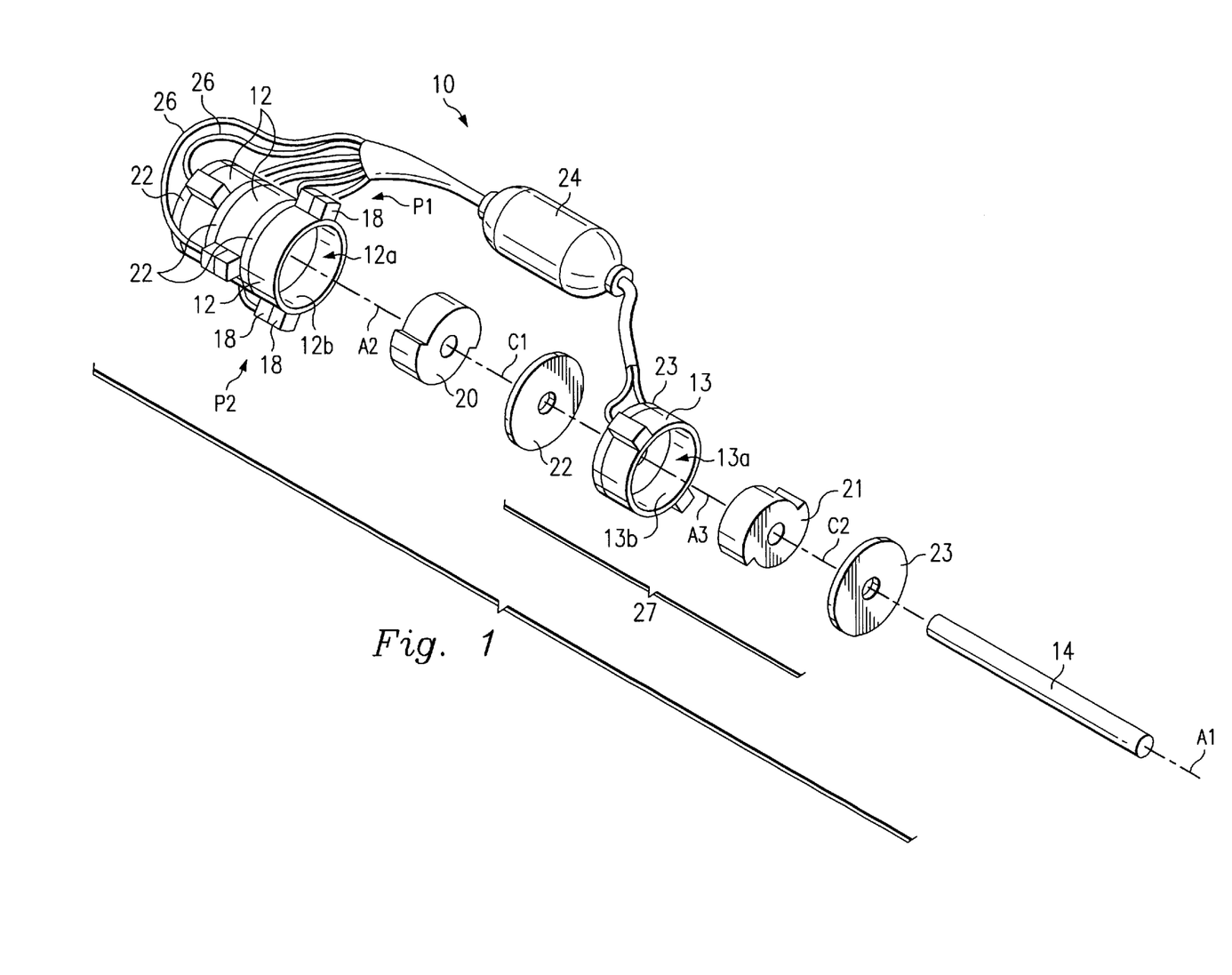
FIG. 1 is an exploded view illustrating an embodiment of a rotary engine having a plurality of stationary adjacent combustion assemblies.

An embodiment of a rotary engine 10 according to the present disclosure is illustrated in FIG. 1. The engine 10 includes a plurality of expansion rotor housings 12 and a compressor rotor housing 13. Each expansion rotor housing 12 includes a generally cylindrical expansion rotor cavity 12a that defines an interior cylindrical surface 12b. Each compression rotor housing 13 includes a generally cylindrical expansion rotor cavity 13a that defines an interior cylindrical surface 13b.

An elongated shaft 14 extends axially through the expansion rotor cavity 12a of each expansion rotor housing 12 and through the compression rotor cavity 13a of the compression rotor housing 13. A longitudinal axis A1 of the shaft 14 is substantially aligned with a longitudinal axis A2 of each expansion rotor cavity 12a and a longitudinal axis A3 of the compression rotor cavity 13a.

A first set of adjacent combustion assemblies 18 is attached to each expansion rotor housing 12 at a first position P1. A second set of adjacent combustion assemblies 18 is attached to each expansion rotor housings 12 at a second position P2. Each set of adjacent combustion assemblies 18 includes at least two adjacent combustion assemblies 18. The first position P1 substantially opposes the second position P2 with respect to the interior cylindrical surface 12b of the respective expansion rotor housing 12.

An expansion rotor 20 is mounted on the shaft 14 in the expansion rotor cavity 12a of each expansion rotor housing 12. A compression rotor 21 is mounted on the shaft 14 in the compression rotor cavity 13a of the compression rotor housing 13. The elongated shaft 14 extends through a centroidal axis C1 of each expansion rotor 20 and through a centroidal axis C2 of the compression rotor 21. Each expansion rotor 20 and the compression rotor 21 are mounted on the shaft 14 in a manner that substantially prevents relative movement between each rotor 20, 21 and the shaft 14.

Each expansion rotor housing 12 has a side plate 22 attached to each opposing side thereof. As illustrated in FIG. 1, adjacent expansion rotor housings 12 share a common side plate 22. In other embodiments (not shown), each expansion rotor housing 12 may be constructed to include a separate pair of side plates 22. The compression rotor housing 13 has a side plate 23 attached to each opposing side thereof.

The compressor rotor housing 13 is attached to a compressed air tank 24 for supplying compressed air to the compressed air tank 24 during operation of the engine 10. A plurality of air routing members 26 are attached to the compressed air tank 24 and to respective ones of the adjacent combustion assemblies 18, 18'. An embodiment of an air compressor unit 27 includes the compression rotor housing 13 and the compression rotor 21. An embodiment of an air delivery system includes the air compressor unit 27, the compressed air tank 24 and the air routing members 26.

As illustrated in FIG. 1, the engine 10 includes two sets of adjacent combustion assemblies 18. In other embodiments (not shown), the engine 10 may include only one set of adjacent combustion assemblies 18, or the engine 10 may include three or more sets of adjacent combustion assemblies evenly spaced around the cylindrical expansion rotor cavity 12a of each expansion rotor housing 12. Each set of adjacent combustion assemblies 18 is substantially identical. Accordingly, only one of the sets of adjacent combustion assemblies 18 and the respective expansion rotor housing 12 will be discussed in detail.

Figure 2A:
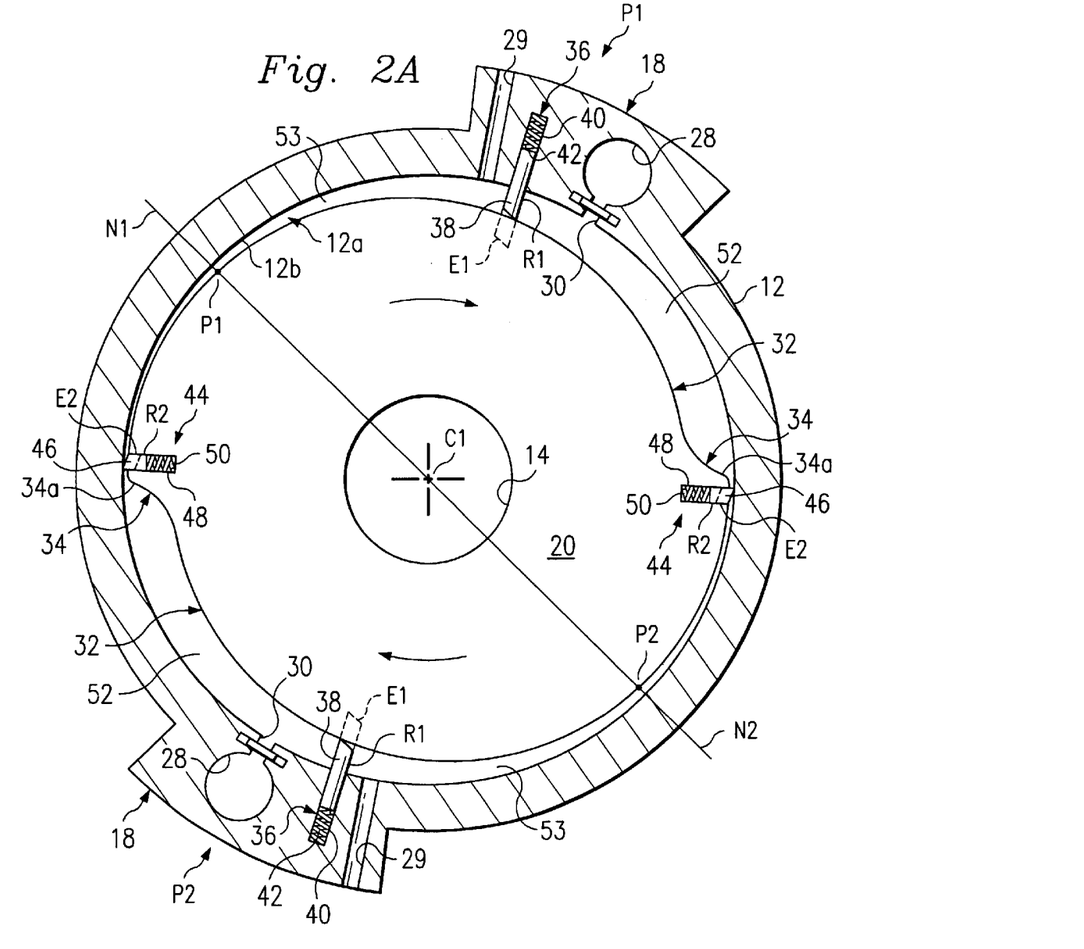
FIG. 2A is a cross sectional view illustrating an embodiment of a power unit.

Referring to FIG. 2A, each combustion assembly 18 includes a combustion chamber 28 and an exhaust port 29 extending from the expansion rotor cavity 12a through the expansion rotor housing 12 to an ambient environment or to an exhaust system (not shown). A passage 30 extends between each combustion chamber 28 and the expansion rotor cavity 12a.

Figure 2B:
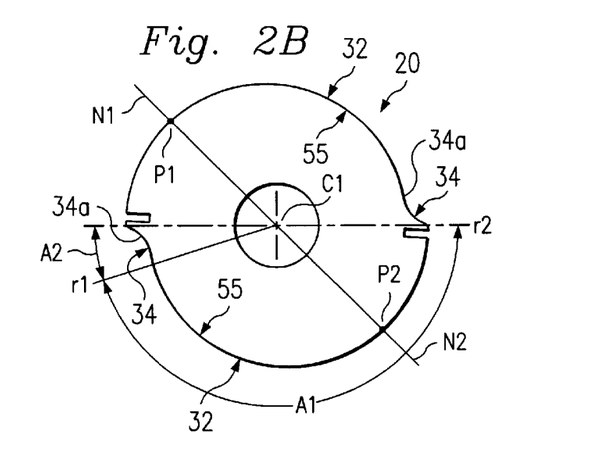
FIG. 2B is a side view illustrating an embodiment of an expansion rotor.

The expansion rotor 20, FIGS. 2A and 2B, has two expansion rotor lobes 32. Each expansion rotor lobe 32 includes a respective transition portion 34. Each transition portion 34 includes a respective smooth transition surface 34a.

A key aspect of embodiments according to the present disclosure is that the expansion rotor lobes 32 of the expansion rotor 20, FIGS. 2A and 2B, are substantial radially symmetrical. By radially symmetrical, it is meant that the expansion rotor lobes 32 are symmetrical relative to evenly spaced radial lines N1, N2 that extend outward from the centroidal axis C1 of the expansion rotor 20. One of the radial lines N1, N2 is associated with each one of the expansion rotor lobes 32. Each radial line N1, N2 intersects the respective expansion rotor lobe 32 at a respective point p1, p2. The points p1, p2 are uniformly spaced about a peripheral edge of he expansion rotor 20. For example, the radial lines N1, N2 are spaced at 180 degrees apart when the expansion rotor 20 includes two expansion rotor lobes 32. In this manner, the expansion rotor 20 is concentrically mounted on the shaft 14 and is concentrically mounted in the expansion rotor cavity, FIG. 2A, when the shaft 14 extends through the centroidal axis C1 of the expansion rotor 20 and through the longitudinal axis A2 of the expansion rotor housing 12.

A first expansion sealing assembly 36 is attached to the expansion rotor housing 12 adjacent to each set of combustion assemblies 18. Each of the first expansion sealing assemblies are substantially identical. Accordingly, only one of the first expansion sealing assembly will be discussed in detail.

The first expansion sealing assembly 36, FIG. 2A, includes a vane seal 38 sidably mounted in a passage 40. The vane seal 38 is movable between an extended position E1 and a retracted position R1. A spring 42 is mounted in the passage 40 for biasing the vane seal 38 to the extended position E1. In other embodiments (not shown), a pneumatic system, hydraulic system, or other type of suitable means may be used for providing a force for biasing the vane seals 38 toward the extended position E1.

A second expansion sealing assembly 44, FIG. 2A, is attached to the expansion rotor 20 adjacent to each transition portion 34 of the expansion rotor 20. Each one of the second expansion sealing assemblies are substantially identical and therefore only one will be discussed in detail. The second sealing assembly 44 includes an apex seal 46 sidably mounted in a respective passage 48. The apex seal 46 is movable between an extended position E2 and a retracted position R2. A spring 50 is mounted in the passage 48 for biasing the respective apex seal 46 to the extended position E2. In other embodiments (not shown) of engines according to the present disclosure, a pneumatic system, hydraulic system, or other type of suitable means may be used for providing a force for biasing the apex seals 46 toward the extended position E2.

In embodiments of engines according to the present disclosure that are intended for high speed operation, the apex seal 46 may be eliminated entirely or the apex seal 46 may be mounted on the expansion rotor 20 in a stationary manner. In such highspeed applications, elimination of the apex seal 46 will result in air flow characteristics between the expansion rotor 20 and the interior cylindrical surface 12b of the expansion rotor housing 12 to provide for a suitable degree of sealing. With a suitable design of the transition portions 34 of each lobe 32, high expansion rotor speeds may create sufficient turbulence between the cylindrical surface 12b and the transition portions 34 to create an air seal which may obviate the need for seals 46.

During rotation of the expansion rotor 20, each vane seal 38 remains substantially in contact with the expansion rotor 20 and each apex seal 46 remains substantially in contact with the interior cylindrical surface 12b of the expansion rotor housing 12. An expansion chamber 52 is defined adjacent to each combustion chamber 28 between the adjacent lobe 32, the adjacent apex seal 46, the adjacent sliding vane seal 38 and the interior cylindrical surface 12b of the expansion rotor cavity 12a. An exhaust chamber 53 is defined adjacent to each exhaust port 29 between the adjacent lobe 32, the adjacent apex seal 46, the adjacent sliding vane seal 38 and the interior cylindrical surface 12b of the expansion rotor cavity 12a.

A key aspect of engines according to the present disclosure is the independence of the expansion ratio from the compression ratio. As illustrated by the engine 10, each expansion chamber 52 and each combustion chamber 28 are defined by separate physical features. Accordingly, the expansion ratio and the compression ratio can be separately defined. The ability to separately define the expansion and compression ratios provides a significant amount of freedom to design an engine with increased thermal efficiency.

The volume of each expansion chamber 52 and the volume of each exhaust chamber 53 are dependent on the profile of the expansion rotor lobes 32 and the diameter of the expansion rotor cavity 12a. Each expansion rotor lobe 32 preferably includes a decreasing radius portion 55, FIG. 2B, that blends into the respective transition portion 34. Each decreasing radius portion 55 defines a first lobe duration A1 and each transition portion 34 defines a second lobe duration A2. The decreasing radius portion 55 of each expansion rotor lobe 32 includes a first lobe radius r1 and a second lobe radius r2.

The second lobe radius r2, the second lobe duration A2 and the position of the transition portions 34 relative to the passages 30 during the transfer of combustion gas from the respective combustion chamber 28 have a significant impact on the torque characteristics of the engine 10. In practice, typical applications will benefit from a rotor design that provides a suitable balance between peak torque and average torque over a typical engine operating speed range.

Figure 3:
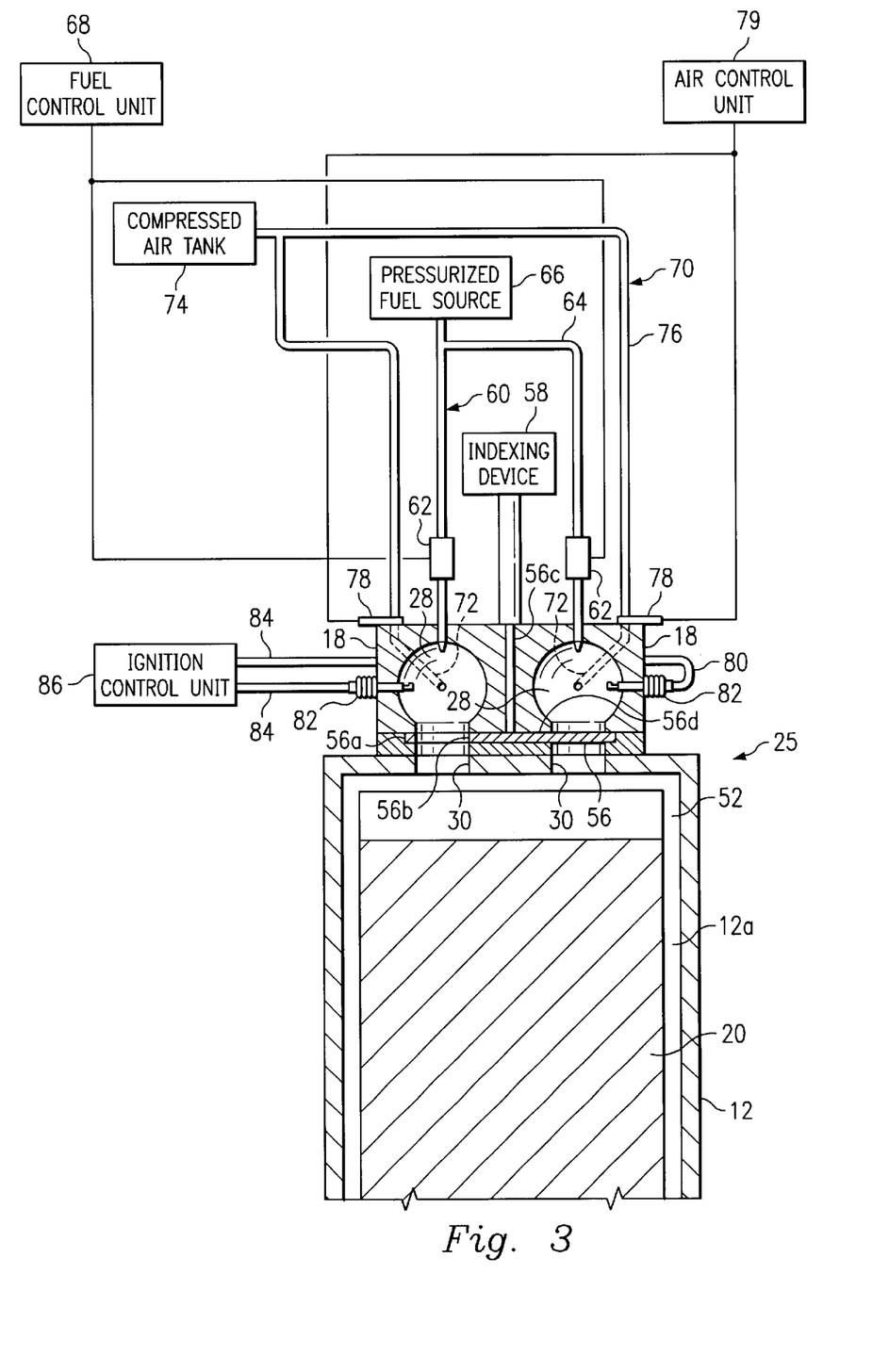
FIG. 3 is a cross sectional view illustrating an embodiment of a power unit having a single adjacent combustion assembly configuration.
Figure 4:
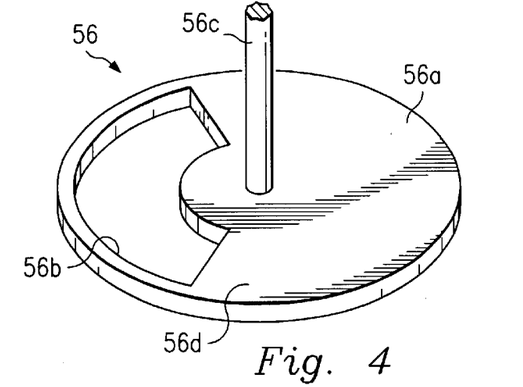
FIG. 4 is a perspective view illustrating an embodiment of a disk valve.

An embodiment of a power unit 25 is illustrated in FIG. 3. A disk valve 56 is rotatably attached between the combustion assemblies 18 for sequentially routing a combustion gas from each combustion chamber 28 to the expansion rotor cavity 12a through the respective passage 30. The disk valve 56, FIGS. 3 and 4, includes a disk portion 56a having an opening 56b extending therethrough. A valve stem 56c is centrally attached to a face 56d of the disk portion 56a.

The disk valve 56, FIG. 3, intersects the passages 30 that extend between the expansion cavity 12a and the combustion chambers 28. During operation of the engine, the disk valve 56 is rotated in synchronous operation with the expansion rotor 20. The flow of the combustion gas from each one of the combustion chambers is accomplished when at least a portion of the opening 56b is aligned with the respective passage 30. The flow of combustion gas from each combustion chamber 28 is blocked by the disk portion 56a when the opening 56b is rotated away from the respective passage 30.

The disk valve 56 is rotated by an indexing device 58 coupled to the expansion rotor 20. Examples of indexing devices include an indexing motor electrically coupled to the rotor and a gear set mechanically coupled to the rotor. Through the use of known electronic engine controls, an electrical indexing motor that is electrically coupled to the rotor may be used to provide sophisticated timing of the disk valve 56, providing enhanced thermal efficiency and reduced harmful emissions.

A fuel delivery system 60, FIG. 3, is attached to the power unit 25. The fuel delivery system 60 is attached to each one of the combustion assemblies 18 for providing a supply of fuel to each one of the combustion chambers 28. A fuel injector 62 is attached to each combustion assembly 18. A fuel routing member 64 is connected between each fuel injector 62 and a pressurized fuel source 66. A fuel tank having an electric or mechanical fuel pump attached thereto illustrates one example of the pressurized fuel source 66. A fuel control unit 68 is connected to each one of the fuel injectors 62 for controlling the flow of fuel to the respective combustion chamber 28. Although not shown, other embodiments of the fuel delivery system 60 are contemplated and will be understood by those skilled in the related art.

An air delivery system 70, FIG. 3, is attached to each one of the combustion assemblies 18 for providing a supply of compressed air to each one of the combustion chambers 28. Each combustion assembly 18 includes an air intake passage 72 for delivering air to the respective combustion chamber 28, a compressed air tank 74 and an air routing member 76 connected between each intake passage 72 and the compressed air tank 74. An air control valve 78 is attached to the air passage 72 of each combustion assembly 18. An air control unit 79 is coupled to each air control valve 78 for controlling the air delivery to each one of the combustion chambers 28. Although not shown, other embodiments of the air delivery system 70 are contemplated and will be understood by those skilled in the related arts.

An ignition system 80, FIG. 3, is attached to each one of the combustion assemblies 18 for providing a source of ignition for an air-fuel intake mixture. An ignition device 82, such as a spark plug, is attached to each combustion assembly 18. A power routing lead 84 is connected between each ignition device 82 and an ignition control unit 86. Although not shown, other embodiments of the ignition system 80 are contemplated and will be understood by those skilled in the related art.

The fuel control unit 68, air control unit 79 and ignition control unit 86 may be physically separate units or separate portions within a unitary engine control system. The fuel control unit 68, air control unit 79 and ignition control unit 86 are preferably interconnected such that the functions of one of the units can be integrated into the function of another unit. Furthermore, the engine 10 may include ancillary components such as oxygen sensors, knock sensors, throttle position sensors, manifold vacuum sensors and the like for providing engine operating information to one or more of the control units 68, 79, 86.

Figure 5:
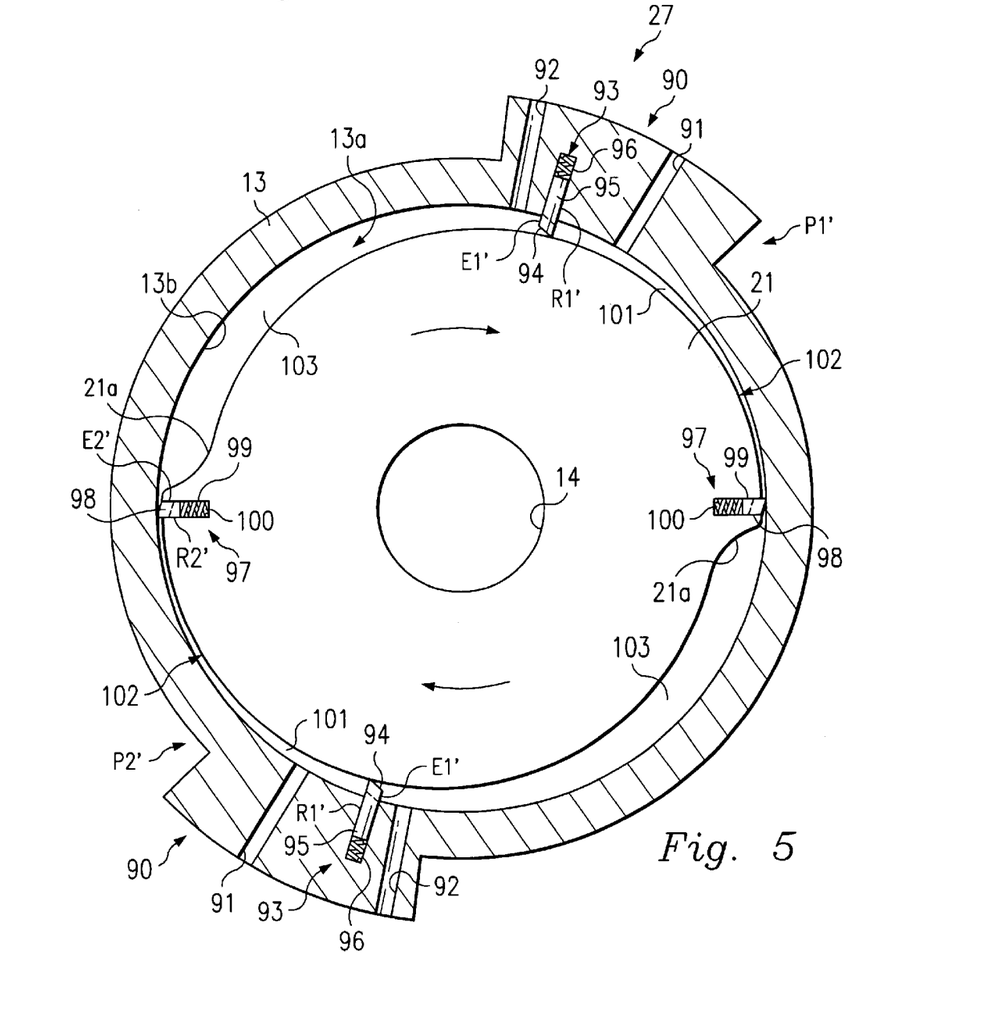
FIG. 5 is cross sectional view illustrating an embodiment of a compressor unit.

The air compressor unit 27, FIG. 5, includes two compression assemblies 90 attached to the compression rotor housing 13. A first one of the compression assemblies 90 is attached to the compression rotor housing 13 at a first position P1'. A second one of the compression assemblies 90 is attached to the compression rotor housing 13 at a second position P2'. The first position P1' substantially opposes the second position P2' with respect to the interior cylindrical surface 13*b* of the compression rotor housing 13. Each one of the compression assemblies 90 includes an air intake port 91 and an air outlet port 92. In other embodiments (not illustrated), three or more compression assemblies may be evenly spaced around a perimeter region of the compression rotor cavity 13*a*.

The first and the second compression assemblies 90 each include a first compression sealing assembly 93. Each one of the first compression sealing assemblies 93 includes a vane seal 94 sidably mounted in a respective passage 95. Each one of the vane seals 94 is movable between an extended position E1' and a retracted position R1'. A spring 96 is mounted in each one of the passages 95 for biasing the respective vane seal 94 to the extended position E1'. In other embodiments (not shown), a pneumatic system, hydraulic system, or other type of suitable means may be used for providing a force for biasing the vane seals 94 toward the extended position E1'.

A second compression sealing assembly 97 is attached to the compression rotor 21 adjacent to a transition portion 21*a* of the compression rotor 21. Each one of the second compression sealing assemblies 97 includes an apex seal 98 slidably mounted in a respective passage 99. Each one of the apex seals 98 is movable between an extended position E2' and a retracted position R2'. A spring 100 is mounted in each one of the passages 99 for biasing the respective apex seal 98 to the extended position E2'. In other embodiments (not shown), a pneumatic system, hydraulic system, or other type of suitable means may be used for providing a force for biasing the apex seals 98 toward the extended position E2'.

During rotation of the compression rotor, each vane seal 94 remains substantially in contact with the compression rotor 21 and each apex seal 98 remains substantially in contact with the interior cylindrical surface 13*b* of the compression rotor housing 13. An air intake chamber 101 is defined adjacent to each air inlet port 91 between an adjacent compression lobe 102 of the compression rotor 21, the adjacent apex seal 98, the adjacent sliding vane seal 94 and the interior cylindrical surface 13*b* of the compression rotor cavity 13*a*. An air compression chamber 103 is defined adjacent to each air outlet port 92 between the adjacent compression lobe 102, the adjacent apex seal 98, the adjacent sliding vane seal 94 and the interior cylindrical surface 13*b* of the compression rotor cavity 13*a*.

Figure 6:
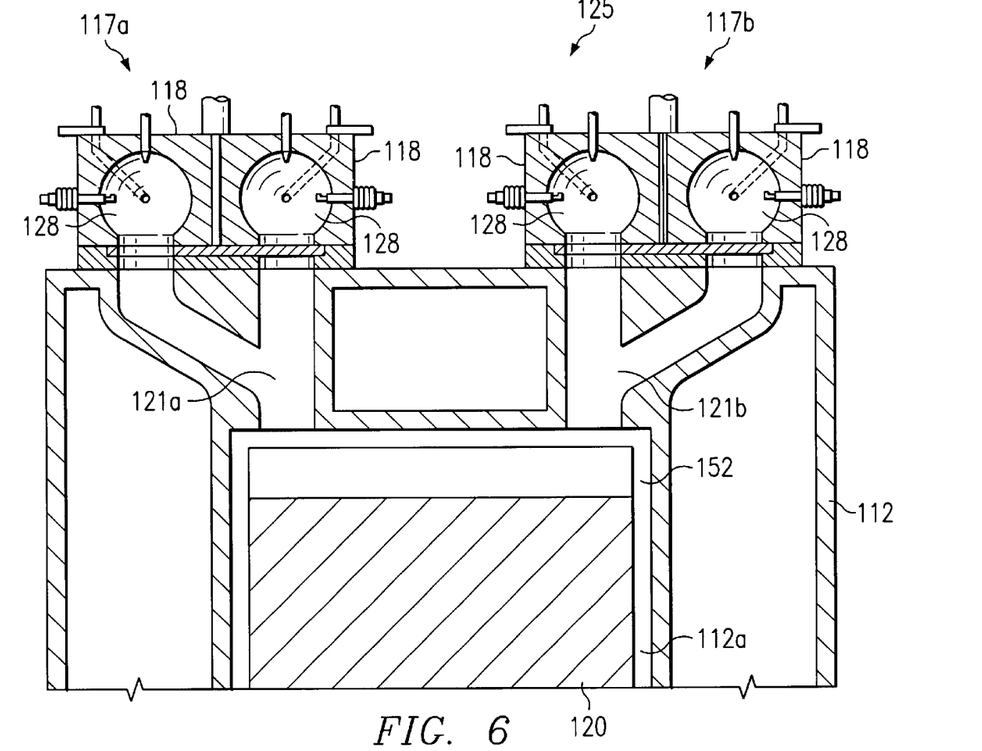
FIG. 6 is a cross sectional view illustrating an embodiment of a power unit having a multiple adjacent combustion assembly configuration.

An embodiment of a power unit 125 having a first adjacent set 117*a* and a second adjacent set 117*b* of combustion assemblies 118 mounted on an expansion rotor housing 112 is illustrated in FIG. 6. An expansion rotor 120 is mounted in an expansion rotor cavity 112*a* of the expansion rotor housing 112. The expansion rotor housing 112 includes a first transfer passage 121*a* and a second transfer passage 121*b*. The first transfer passage 121*a* is connected between the expansion chamber 152 and the first adjacent set 117*a* of combustion assemblies 118. The second transfer passage 121*b* is connected between the expansion chamber 152 and the second adjacent set 117*b* of combustion assemblies 118. Each one of the combustion assemblies 118 includes a combustion chamber 128.

The power unit 125 is well suited for large displacement applications. For each power event, expansion gases are provided by one of the combustion chambers 118 from each adjacent set 117*a*, 117*b* of combustion assemblies 118. In this manner, a more uniform distribution of pressure can be exerted on the rotor 120. Furthermore, a greater volume of expansion gas can be provided for each power event without necessitating that combustion chambers 128 be made excessively large.

The use of excessively large combustion chambers often results in incomplete combustion due to inadequate mixing of the air and fuel, and due to the rate of flame propagation relative to the size of the combustion chamber and the duration of the combustion phase of the power event. The use of excessively large combustion chambers also significantly increases the overall size of an engine such that the combustion chambers can be physically accommodated.

Extended duration of the combustion phase of the power event is required to overcome problems associated with excessively large combustion chambers, such as inadequate air-fuel mixing and slow flame propagation. Such an extended duration results in limiting the speed at which the engine can operate. The ability to operate large displacement engines at high speeds significantly increases power-to-weight and power-to-displacement ratios. Accordingly, it may be advantageous to construct each combustion chamber to an optimal volume.

A method of facilitating power events, intake events and exhaust events in an engine according to the present disclosure is illustrated in FIGS. 7A–7D. Such an engine includes a first combustion chamber CC1 adjacent to a second combustion chamber CC2. Each power event includes a combustion phase and an expansion phase.

The engine cycle disclosed herein, hereinafter referred to as the Wright cycle, offers improved power density and thermal efficiency, reduced exhaust noise and emissions, and reduced manufacturing cost relative to conventional engines. A key aspect of the Wright cycle is the separation of the compression, power and exhaust events, allowing the efficiency of each event to be separately designed to provide improved overall thermal efficiency.

Figure 7A:
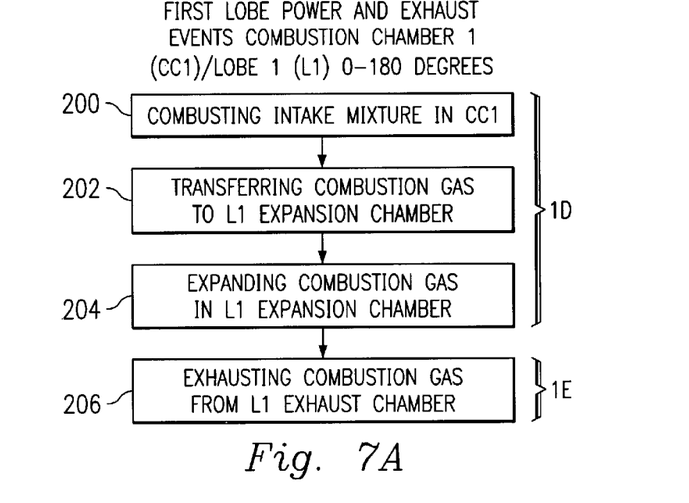
FIGS. 7A–7D are diagrammatic views illustrating an embodiment of an engine event cycle according to the present disclosure.

A first lobe power event 1P and a first lobe exhaust event 1E for a first lobe of an expansion rotor, FIG. 7A, occur in a first 180 degrees of rotation of the expansion rotor. In a step 200, a first lobe combustion phase of the first lobe power event 1P is performed in a first combustion chamber CC1. The first lobe combustion phase of the first lobe power event 1P includes igniting an intake mixture in the first combustion chamber CC1.

At a step 202, a first lobe expansion phase of the first lobe power event 1P begins by the transfer of the combustion gas in the first combustion chamber CC1 to a first lobe expansion chamber. The first lobe expansion chamber is defined in part by the first lobe L1 of the expansion rotor. At a step 204, the combustion gas expands in the first lobe expansion chamber. The step 200 of combusting the intake mixture, the step 202 of transferring the combustion gas and the step 204 of expanding the combustion gas may overlap such that at least a portion of the intake mixture is being combusted while a portion of the combusted gas is being transferred to the first lobe expansion chamber and expanded therein.

At a step 206, a first lobe exhaust event 1E is conducted. The first lobe exhaust event 1E includes exhausting the expanded, or at least partially expanded, combustion gas from a first lobe exhaust chamber through a first exhaust port. The first lobe exhaust chamber is defined in part by the first lobe L1.

Figure 7B:
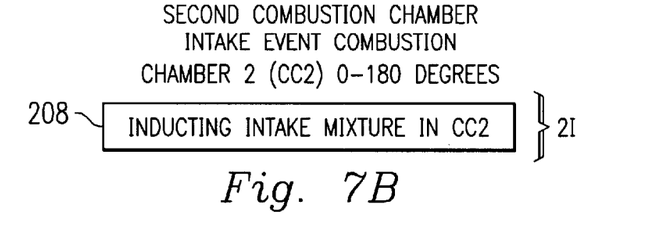

At a step 208, FIG. 7B, a second combustion chamber CC2 intake event 2I is performed. The second combustion chamber intake event 2I includes inducting an intake mixture into the second combustion chamber CC2. The step 208 is performed during all or a portion of the time required for conducting the steps 200–206 of FIG. 7A.

Figure 7C:
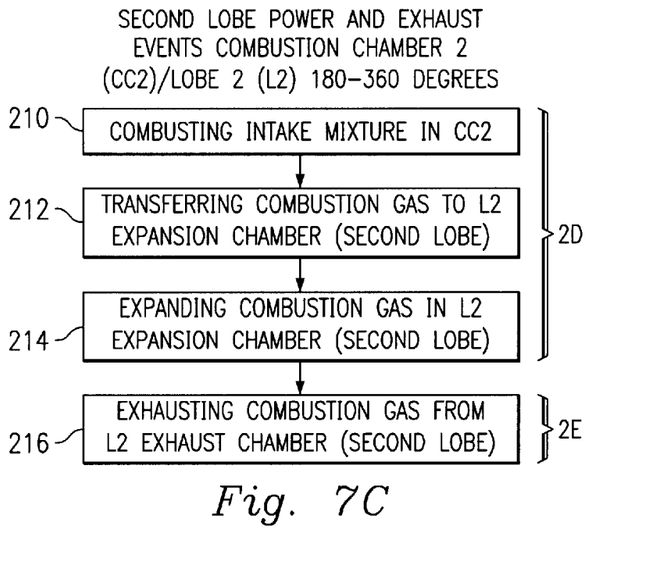

A second lobe power event 2P and a second lobe exhaust event 2E, FIG. 7C, occur in a second 180 degrees of rotation of the expansion rotor. In a step 210, a second lobe combustion phase of the second lobe power event 2P is performed in second combustion chamber CC2. The second lobe combustion phase of the second lobe power event 2P includes igniting an intake mixture in the second combustion chamber CC2.

At a step 212, a second lobe expansion phase of the second lobe power event 2P begins by the transfer of the combustion gas in the second combustion chamber CC2 to a second lobe expansion chamber. The second lobe expansion chamber is defined in part by the second lobe L2 of the expansion rotor. At a step 214, the combustion gas expands in the second lobe expansion chamber. The step 210 of combusting the intake mixture, the step 212 of transferring the combustion gas and the step 214 of expanding the combustion gas may overlap such that at least a portion of the intake mixture is being combusted while a portion of the combusted gas is being transferred to the second lobe expansion chamber and expanded therein.

At a step 216, a second lobe exhaust event 2E is conducted. The second lobe exhaust event 2E includes exhausting the expanded, or at least partially expanded, combustion gas from a second lobe exhaust chamber through a second exhaust port.

The second lobe exhaust chamber is defined in part by the second lobe L2.

Figure 7D:
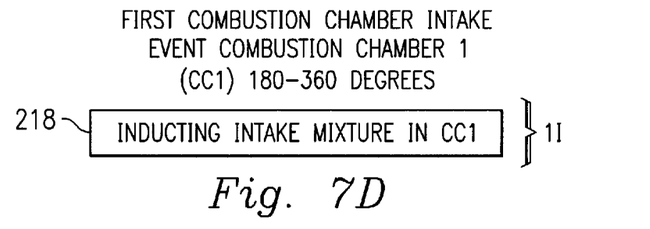

Also during the second 180 degrees of rotation of the expansion rotor, at a step 218, a first combustion chamber CC1 intake event 1I is performed, FIG. 7D. The first combustion chamber intake event 1I includes inducting an intake mixture into the first combustion chamber CC1. The step 218 is performed during all or a portion of the time required for conducting the steps 210–216 of FIG. 7C.

The intake mixture can be ignited by an ignition device or by autoignition, thereby combusting the intake mixture to produce a combustion gas at an elevated temperature and pressure. The elevated pressure of the combustion gas causes the combustion gas to expand in the expansion chambers, exerting a force on the rotor that causes the rotor and an attached output shaft to rotate.

The combustion gas is the product of the combustion of an intake mixture of air and a fuel such as gasoline. The air is provided to the combustion chambers CC1, CC2 from a suitable air supply system. Fuel is provided to the combustion chambers CC1, CC2 by a suitable fuel supply system.

As a result, one embodiment provides a rotary engine including an expansion rotor housing having a generally cylindrical expansion rotor cavity. An elongated shaft extends through the expansion rotor cavity along a longitudinal axis of the expansion rotor cavity. A first set of adjacent combustion assemblies is attached to the expansion rotor housing. Each one of the combustion assemblies includes a combustion chamber. An expansion rotor is mounted on the shaft in the expansion rotor cavity such that the elongated shaft extends through a centroidal axis of the expansion rotor.

Another embodiment of a rotary engine includes an expansion rotor housing having a generally cylindrical expansion rotor cavity. An elongated shaft extends through the expansion rotor cavity along a longitudinal axis of the expansion rotor cavity. A set of adjacent combustion assemblies is attached to the expansion rotor housing. Each one of the combustion assemblies includes a first combustion chamber and a second combustion chamber. A first passage extends between the expansion rotor cavity and the first combustion chamber of each combustion assembly. A second passage extends between the expansion rotor cavity and the second combustion chamber of each combustion assembly. An expansion rotor is mounted on the shaft in the expansion rotor cavity such that the elongated shaft extends through a centroidal axis of the expansion rotor.

An embodiment of an engine system includes a plurality of adjacent expansion rotor housings each having a generally cylindrical expansion rotor cavity. The expansion rotor cavity of each expansion rotor housing is substantially aligned with the expansion rotor cavity of each other expansion rotor housing. An elongated shaft extends through the expansion rotor cavity of each expansion rotor housing along a respective longitudinal axis of each expansion rotor cavity. A set of adjacent combustion assemblies is attached to each one of the expansion rotor housings. Each one of the combustion assemblies includes a combustion chamber. An expansion rotor is mounted on the shaft in the expansion rotor cavity of each expansion rotor housing such that the elongated shaft extends through a centroidal axis of each expansion rotor. A fuel delivery system is attached to each one of the combustion assemblies for providing a supply of fuel to each one of the combustion chambers. An air delivery system is attached to each one of the combustion assemblies for providing a supply of air to each one of the combustion chambers.

An embodiment of a combustion assembly includes an expansion rotor housing having a generally cylindrical expansion rotor cavity and an exhaust port. A set of adjacent combustion assemblies is attached to the expansion rotor housing. Each one of the combustion assemblies includes a combustion chamber. A passage extends between the expansion rotor cavity and each one of the combustion chambers. A sealing assembly is attached to the expansion rotor housing adjacent to the set of adjacent combustion assemblies. The sealing assembly includes a sealing portion positioned between the exhaust port and the set of adjacent combustion assemblies. The sealing portion engages a surface of the expansion rotor. A means is provided for sequentially routing a combustion gas from each combustion chamber to the expansion rotor cavity through a respective one of the passages.

An embodiment of an electric power generating system includes an expansion rotor housing having a generally cylindrical expansion rotor cavity. An elongated output shaft extends through the expansion rotor cavity along a longitudinal axis of the expansion rotor cavity. A set of adjacent combustion assemblies is attached to the expansion rotor housing. Each one of the combustion assemblies includes a combustion chamber and a passage extending between the expansion rotor cavity and each one of the combustion chambers. An expansion rotor is mounted on the output shaft in the expansion rotor cavity such that the output shaft extends through a centroidal axis of the expansion rotor. A fuel delivery system is attached to each one of the combustion assemblies for providing a supply of fuel to each one of the combustion chambers. An air delivery system is attached to each one of the combustion assemblies for providing a supply of air to each one of the combustion chambers. An electrical generator includes an input shaft. The input shaft of the electrical generator is coupled to the output shaft.

An embodiment of a method of operating a rotary engine having an expansion rotor mounted in an expansion rotor housing and a plurality of adjacent combustion assemblies mounted on the expansion rotor housing includes performing a first lobe power event during the first portion of the rotary cycle of the expansion rotor. A first lobe expansion phase of the first lobe power event is performed in a first lobe expansion chamber and a first lobe combustion phase of the first lobe power event is performed in a combustion chamber of a first one of the adjacent combustion assemblies. A second lobe power event is performed during a second portion of the rotary cycle. A second lobe expansion phase of the second lobe power event is performed in a second lobe expansion chamber and a second lobe combustion phase of the second lobe power event is performed in a combustion chamber of a second one of the adjacent combustion assemblies.

As it can be seen, the advantages of these embodiments are that engines operated according to the Wright cycle can be operated under very lean conditions and very high expansion ratios, providing increased thermal efficiency and lower exhaust gas temperatures. A key benefit of the increased thermal efficiency and lower exhaust gas temperatures is the reduction of NOx emissions, which are detrimental to air quality. Accordingly, engine designs that achieve reduced NOx emissions while still achieving modest thermal efficiency are very desirable. The ability to separately specify the compression ratio and the expansion ratio plays a large part in achieving increased thermal efficiency. By separating the compression and power events, they can be independently designed and controlled. This attribute of engine embodiments disclosed herein contributes to achieving a relatively high expansion ratio. In addition to reducing the exhaust gas temperatures, the high expansion ratio also reduces exhaust noise.

A distinguishing physical attribute of power assemblies configured to operate according to the Wright cycle is the use of multiple adjacent combustion assemblies for each rotor. The implementation of multiple adjacent combustion chambers permits ample time to perform the power events and to perform the intake events. Through the use of adjacent combustion assemblies, an intake event in one of the adjacent combustion chambers may be performed while the power event in another one of the adjacent combustion chambers is proceeding. This attribute is a key factor in the improved thermal efficiency achieved by engines configured to be operated according to the Wright cycle.

Engines configured to be operated according to the Wright cycle exhibit several other attributes that contribute to providing increased thermal efficiency and enhanced overall engine performance. The expansion rotor, and compression rotor if applicable, are radially symmetric, providing a substantially balanced rotational mass. The use of a compressed air tank allows for the use of a single air tank and air compressor for providing compressed air to a plurality of combustion units. The modular construction of the power units allows the displacement of an engine to be cost effectively sized for a particular application. The use of rotary disk valves provides a simple, effective and reliable means of controlling the transfer of combustion gases from the combustion chambers to the respective expansion chambers. Flexible design parameters, particularly the expansion ratio and compression ratio, permit engines configured to be operated according to the Wright cycle to be constructed for use with a wide range of liquid and gaseous fuels.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A rotary engine, comprising:
   an expansion rotor housing having a generally cylindrical expansion rotor cavity therein;
   an elongated shaft extending through the expansion rotor cavity along a longitudinal axis of the expansion rotor cavity;
   a first set of at least two adjacent combustion assemblies attached to and separated from the expansion rotor housing by a valve, each one of the at least two combustion assemblies including a combustion chamber therein; and
   an expansion rotor mounted on the shaft in the expansion rotor cavity such that the elongated shaft extends through a centroidal axis of the expansion rotor.

2. The engine of claim 1, further comprising:
   a second set of adjacent combustion assemblies attached to the expansion rotor housing, the second set of adjacent combustion assemblies being spaced apart from the first set of adjacent combustion assemblies.

3. The engine of claim 2 wherein the first set of adjacent combustion assemblies is mounted on the expansion rotor housing at a first position and the second set of adjacent combustion assemblies is mounted on the expansion rotor housing at a second position, the first position substantially opposing the second position with respect to an interior cylindrical surface of the expansion rotor cavity.

4. The engine of claim 1 wherein each one of the combustion chambers is positioned adjacent to a common reference axis, the common reference axis extending generally parallel to the centroidal axis of the expansion rotor.

5. The engine of claim 1, further comprising:
   a first sealing assembly attached to the expansion rotor housing adjacent to the first set of adjacent combustion assemblies, the first sealing assembly including a sealing portion engaged with the expansion rotor.

6. The engine of claim 5 wherein the sealing portion of the first sealing assembly includes a sliding vane seal mounted on the expansion rotor housing, the sliding vane seal being movable between a retracted position and an extended position.

7. The engine of claim 6 wherein the expansion rotor housing includes an exhaust port therein, the sliding vane seal positioned between the exhaust port and the first set of adjacent combustion assemblies.

8. The engine of claim 5, further comprising:
   a second sealing assembly attached to the expansion rotor adjacent to a transition portion of the expansion rotor and including a sealing portion engaged with an interior cylindrical surface of the expansion rotor cavity.

9. The engine of claim 8 wherein the sealing portion of the second sealing assembly includes an apex seal slidably mounted on the expansion rotor for being moved between a retracted position and an extended position.

10. The engine of claim 1 wherein each one of the combustion assemblies includes a passage extending between the expansion rotor cavity and each one of the respective combustion chambers.

11. The engine of claim 1, further comprising:
a fuel delivery system attached to each one of the combustion assemblies for providing a supply of fuel to each one of the combustion chambers; and
an air delivery system attached to each one of the combustion assemblies for providing a supply of air to each one of the combustion chambers.

12. The engine of claim 11, further comprising:
an ignition system attached to each one of the combustion assemblies.

13. The engine of claim 1 wherein the set of adjacent combustion assemblies is stationary with respect to the expansion rotor housing.

14. A rotary engine, comprising:
an expansion rotor housing having a generally cylindrical expansion rotor cavity therein;
an elongated shaft extending through the expansion rotor cavity along a longitudinal axis of the expansion rotor cavity;
a first set of adjacent combustion assemblies attached to the expansion rotor housing, each one of the combustion assemblies including a combustion chamber therein;
an expansion rotor mounted on the shaft in the expansion rotor cavity such that the elongated shaft extends through a centroidal axis of the expansion rotor;
each one of the combustion assemblies including a passage extending between the expansion rotor cavity and each one of the respective combustion chambers; and
means for sequentially routing a flow of combustion gas from each combustion chamber to the expansion rotor cavity through a respective one of the passages.

15. The engine of claim 14 wherein the means for sequentially routing includes a disk valve rotatably-attached to the expansion rotor housing and coupled to the elongated shaft, the disk valve having an opening therein and being positioned to intersect a first one and a second one of the passages, wherein during rotation of the disk valve, the flow of combustion gas from each one of the combustion chambers is accomplished when at least a portion of the opening is aligned with a respective one of the passages, and the flow of combustion gas from each combustion chamber is blocked when the entire opening is rotated away from the respective passage.

16. A rotary engine, comprising:
an expansion rotor housing having a generally cylindrical expansion rotor cavity therein;
an elongated shaft extending through the expansion rotor cavity along a longitudinal axis of the expansion rotor cavity;
a first set of adjacent combustion assemblies attached to the expansion rotor housing, each one of the combustion assemblies including a combustion chamber therein;
an expansion rotor mounted on the shaft in the expansion rotor cavity such that the elongated shaft extends through a centroidal axis of the expansion rotor;
a fuel delivery system attached to each one of the combustion assemblies for providing a supply of fuel to each one of the combustion chambers;
an air delivery system attached to each one of the combustion assemblies for providing a supply of air to each one of the combustion chambers; and
the air delivery system including a compressed air source and a plurality of air routing members, each one of the air routing members being attached to the compressed air source and to a respective one of the combustion assemblies.

17. The engine of claims wherein the compressed air source includes an air compressor attached to a compressed air tank for providing compressed air thereto, each one of the routing members being attached to the compressed air tank.

18. The engine of claim 17 wherein the air compressor includes:
a compression rotor housing having a cylindrical compression rotor cavity therein, the elongated shaft extending axially through the compression rotor cavity and each one of the air routing members being connected to the compressor rotor housing; and
a compression rotor mounted on the shaft in the compression rotor cavity such that the elongated shaft extends through a centroidal axis of the compression rotor.

19. A rotary engine, comprising:
an expansion rotor housing having a generally cylindrical expansion rotor cavity therein;
an elongated shaft extending through the expansion rotor cavity along a longitudinal axis of the expansion rotor cavity;
a set of at least two adjacent combustion assemblies attached to and separated from the expansion rotor housing by a valve, each one of the at least two combustion assemblies including a first combustion chamber and a second combustion chamber, a first passage extending between the expansion rotor cavity and the first combustion chamber of each combustion assembly, and a second passage extending between the expansion rotor cavity and the second combustion chamber of each combustion assembly; and
an expansion rotor mounted on the shaft in the expansion rotor cavity such that the elongated shaft extends through a centroidal axis of the expansion rotor.

20. An engine system, comprising:
a plurality of adjacent expansion rotor housings each having a generally cylindrical expansion rotor cavity therein, the expansion rotor cavity of each expansion rotor housing being substantially aligned with the expansion rotor cavity of each other expansion rotor housing;
an elongated shaft extending through the expansion rotor cavity of each expansion rotor housing along a respective longitudinal axis of each expansion rotor cavity;
a set of at least two adjacent combustion assemblies attached to and separated from each one of the expansion rotor housings by a valve, each one of the at least two combustion assemblies including a combustion chamber therein;
an expansion rotor mounted on the shaft in the expansion rotor cavity of each expansion rotor housing such that the elongated shaft extends through a centroidal axis of each expansion rotor;
a fuel delivery system attached to each one of the combustion assemblies for providing a supply of fuel to each one of the combustion chambers; and an air delivery system attached to each one of the combustion assemblies for providing a supply of air to each one of the combustion chambers.

21. A combustion assembly, comprising:

an expansion rotor housing having a generally cylindrical expansion rotor cavity and an exhaust port therein;

a set of adjacent combustion assemblies attached to the expansion rotor housing, each one of the combustion assemblies including a combustion chamber therein and a passage extending between the expansion rotor cavity and each one of the combustion chambers;

a sealing assembly attached to the expansion rotor housing adjacent to the set of adjacent combustion assemblies, the sealing assembly including a sealing portion positioned between the exhaust port and the set of adjacent combustion assemblies, the sealing portion engaging a surface of the expansion rotor; and means for sequentially routing a combustion gas from each combustion chamber to the expansion rotor cavity through a respective one of the passages.

22. An electric power generating system, comprising:

an expansion rotor housing having a generally cylindrical expansion rotor cavity therein;

an elongated output shaft extending through the expansion rotor cavity along a longitudinal axis of the expansion rotor cavity;

a set of at least two adjacent combustion assemblies attached to and separated from the expansion rotor housing by a valve, each one of the at least two combustion assemblies including a combustion chamber therein and a passage extending between the expansion rotor cavity and each one of the combustion chambers;

an expansion rotor mounted on the output shaft in the expansion rotor cavity such that the output shaft extends through a centroidal axis of the expansion rotor;

a fuel delivery system attached to each one of the combustion assemblies for providing a supply of fuel to each one of the combustion chambers;

an air delivery system attached to each one of the combustion assemblies for providing a supply of air to each one of the combustion chambers; and an electrical generator including an input shaft, the input shaft of the electrical generator being coupled to the output shaft.

23. A method of operating a rotary engine having an expansion rotor mounted in an expansion rotor housing and a plurality of adjacent combustion assemblies mounted on the expansion rotor housing, comprising:

performing a first lobe power event during a first portion of a rotary cycle of the expansion rotor, wherein a first lobe expansion phase of the first lobe power event is performed in a first lobe expansion chamber, and wherein a first lobe combustion phase of the first lobe power event is performed in a combustion chamber of a first one of at least two adjacent combustion assemblies;

performing a second lobe power event during a second portion of the rotary cycle, wherein a second lobe expansion phase of the second lobe power event is performed in a second lobe expansion chamber, and wherein a second lobe combustion phase of the second lobe power event is performed in a combustion chamber of a second one of the at least two adjacent combustion assemblies; and each one of the at least two adjacent combustion assemblies being attached to and separated from the expansion chambers by a valve.

24. The method of claim 23, further comprising:

performing a first combustion chamber intake event during the second portion of the rotary cycle; and performing a second combustion chamber intake event during the first portion of the rotary cycle.

25. The method of claim 23, further comprising:

performing a first lobe exhaust event during the first portion of the rotary cycle; and performing a second lobe exhaust event during the second portion of the rotary cycle.

26. A method of operating a rotary engine having an expansion rotor mounted in an expansion rotor housing and a plurality of adjacent combustion assemblies mounted on the expansion rotor housing, comprising:

performing a first lobe power event during a first portion of a rotary cycle of the expansion rotor, wherein a first lobe expansion phase of the first lobe power event is performed in a first lobe expansion chamber, and wherein a first lobe combustion phase of the first lobe power event is performed in a combustion chamber of a first adjacent combustion assembly;

performing a second lobe power event during a second portion of the rotary cycle, wherein a second lobe expansion phase of the second lobe power event is performed in a second lobe expansion chamber, and wherein a second lobe combustion phase of the second lobe power event is performed in a combustion chamber of a second adjacent combustion assembly;

performing a first combustion chamber intake event during the second portion of the rotary cycle;

performing a second combustion chamber intake event during the first portion of the rotary cycle;

wherein performing the first combustion chamber intake event includes compressing air into the combustion chamber of the first adjacent combustion assembly; and wherein performing the second combustion chamber intake event includes compressing air into the combustion chamber of the second adjacent combustion assembly.

27. The method of claim 26 wherein compressing air includes compressing air into a compressed air tank and routing compressed air from the compressed air tank to the first and the second adjacent combustion assemblies.

28. A method of operating a rotary engine having an expansion rotor mounted in an expansion rotor housing and a plurality of adjacent combustion assemblies mounted on the expansion rotor housing, comprising:

performing a first lobe power event during a first portion of a rotary cycle of the expansion rotor, wherein a first lobe expansion phase of the first lobe power event is performed in a first lobe expansion chamber, and wherein a first lobe combustion phase of the first lobe power event is performed in a combustion chamber of a first adjacent combustion assembly;

performing a second lobe power event during a second portion of the rotary cycle, wherein a second lobe expansion phase of the second lobe power event is performed in a second lobe expansion chamber, and wherein a second lobe combustion phase of the second lobe power event is performed in a combustion chamber of a second adjacent combustion assembly;

wherein performing the first lobe power event includes opening a first transfer passage extending between the combustion chamber of the first adjacent combustion assembly and the first lobe expansion chamber for allowing a combustion gas to be transferred from the combustion chamber of the first adjacent combustion assembly to the first lobe expansion chamber; and wherein performing the second lobe power event includes opening a second transfer passage extending between the combustion chamber of the second adjacent combustion assembly and the second lobe expansion chamber for allowing a combustion gas to be transferred from the combustion chamber of the second adjacent combustion assembly to the second lobe expansion chamber.

29. The method of claim 28 wherein opening the first transfer passage includes at least partially aligning an opening in a disk valve with the first transfer passage during the first portion of the rotary cycle, and wherein opening the second transfer passage include at least partially aligning the opening in the disk valve with the second transfer passage during the second portion of the rotary cycle.

30. The method of claim 29 wherein aligning the opening includes rotating the disk valve.

* * * * *